United States Patent [19]

Nakayama et al.

[11] Patent Number: 5,021,948
[45] Date of Patent: Jun. 4, 1991

[54] PROGRAM COUNTER DISPLAY DEVICE

[75] Inventors: Yasuko Nakayama, Kawasaki; Kazuo Aida, Tokyo, both of Japan

[73] Assignee: Kabushiki Kaisha Toshiba, Kawasaki, Japan

[21] Appl. No.: 31,280

[22] Filed: Mar. 30, 1987

[30] Foreign Application Priority Data

Mar. 29, 1986 [JP] Japan .................... 61-72162

[51] Int. Cl.[5] ................................. G06F 9/455
[52] U.S. Cl. ......................... 364/200; 364/264.3; 364/265.6; 364/267; 364/267.4; 364/267.91; 364/286; 371/19
[58] Field of Search ... 364/200 MS File, 900 MS File; 371/19

[56] References Cited

U.S. PATENT DOCUMENTS

| | | | |
|---|---|---|---|
| 3,522,597 | 8/1970 | Murphy | 364/200 |
| 3,987,420 | 10/1976 | Badanani | 364/200 |
| 4,009,379 | 2/1977 | Musch | 364/900 |
| 4,181,965 | 1/1980 | Olander, Jr. et al. | 364/200 |
| 4,275,441 | 6/1981 | Takeuchi | 364/200 |
| 4,376,977 | 3/1983 | Bruinshorst | 364/200 |
| 4,445,169 | 4/1984 | Wakita et al. | 364/147 |
| 4,571,677 | 2/1986 | Hirayama et al. | 364/200 |
| 4,636,940 | 1/1987 | Goodwin, Jr. | 364/200 |
| 4,730,315 | 3/1988 | Saito et al. | 364/200 |
| 4,872,167 | 10/1989 | Maezawa et al. | 364/200 |

OTHER PUBLICATIONS

Ralston, A. and E. D. Reilly, Jr., "Software Erros," *Encyclopedia of Computer Science and Engineering*, p. 616 (2nd Ed. 1983).
Mare H. Brown and Robert Sedgewick, "A System for Algorithm Animation", Computer Graphics, vol. 18, No. 3, Jul. 1984, pp. 177-186.
Marc H. Brown and Robert Sedgewick, "Techniques for Algorithm Animation," IEEE Software, vol. 2, No. 2, Jan. 1985, pp. 28-29.
James E. Brink and Richard J. Spillman, Computer Architecture and VAX Assembly Language Programming, The Benjamin/ Cummings Publishing Company, Inc., Menlo Park, California, 1987, pp. 536-555.
Marc H. Brown and Robert Sedgewick, "Progress Report: Brown University Instructional Computing Laboratory," ACM SIECSE Bulletin, vol. 16, No. 1, FEb. 1984, pp. 91-101.
Marc H. Brown, Norman Meyrowitz, and Andries van Dam, "Personal Computer Networks and Graphical Animation: Rationale and Practice for Education," ACM SIECSE Bulletin, vol. 15, No. 1, Feb. 1983, pp. 296-307.
A Tutorial Introduction to ADB; Maranzano et al.; May 5, 1977.
Microsoft Code View; Microsoft Corporation; 1986.

*Primary Examiner*—Gareth D. Shaw
*Assistant Examiner*—Matthew C. Fagan
*Attorney, Agent, or Firm*—Oblon, Spivak, McClelland, Maier & Neustadt

[57] ABSTRACT

A program counter display device having a program memory which stores a source program. An interpreter reads out the source program from the program memory and executing it. A program list generator generates a program list of the program stored in the program memory, and a program flow monitor having knowledge of the program flow determines the program flow in accordance with the statement currently being executed. A control structure monitor correlates the current statement supplied from the interpreter with a program control structure, and checks the balance of the program control structure such as the existence of an end in a loop structure, the existence of a destination of a branch sentence, etc. A program counter-mark generator connected to the program flow monitor and the control structure monitor generates a program counter mark indicating the program counter function, the program flow, and the control sturcture. A display device connects to the program list generator and to the program counter mark generator and displays the program counter mark in association with the program list. The program counter mark is constituted by a box section which is displayed over the range of the program list included in the program control structure. A direction-indicating section is displayed within the box section, and indicates which statement is currently being executed, and also the direction of program flow. When the arrow of the direction-indicating section is pointing right, the arrow is pointing to the current statement; when the arrow is pointing upward or downward, the arrow is indicating the program flow.

5 Claims, 7 Drawing Sheets

F I G. 1
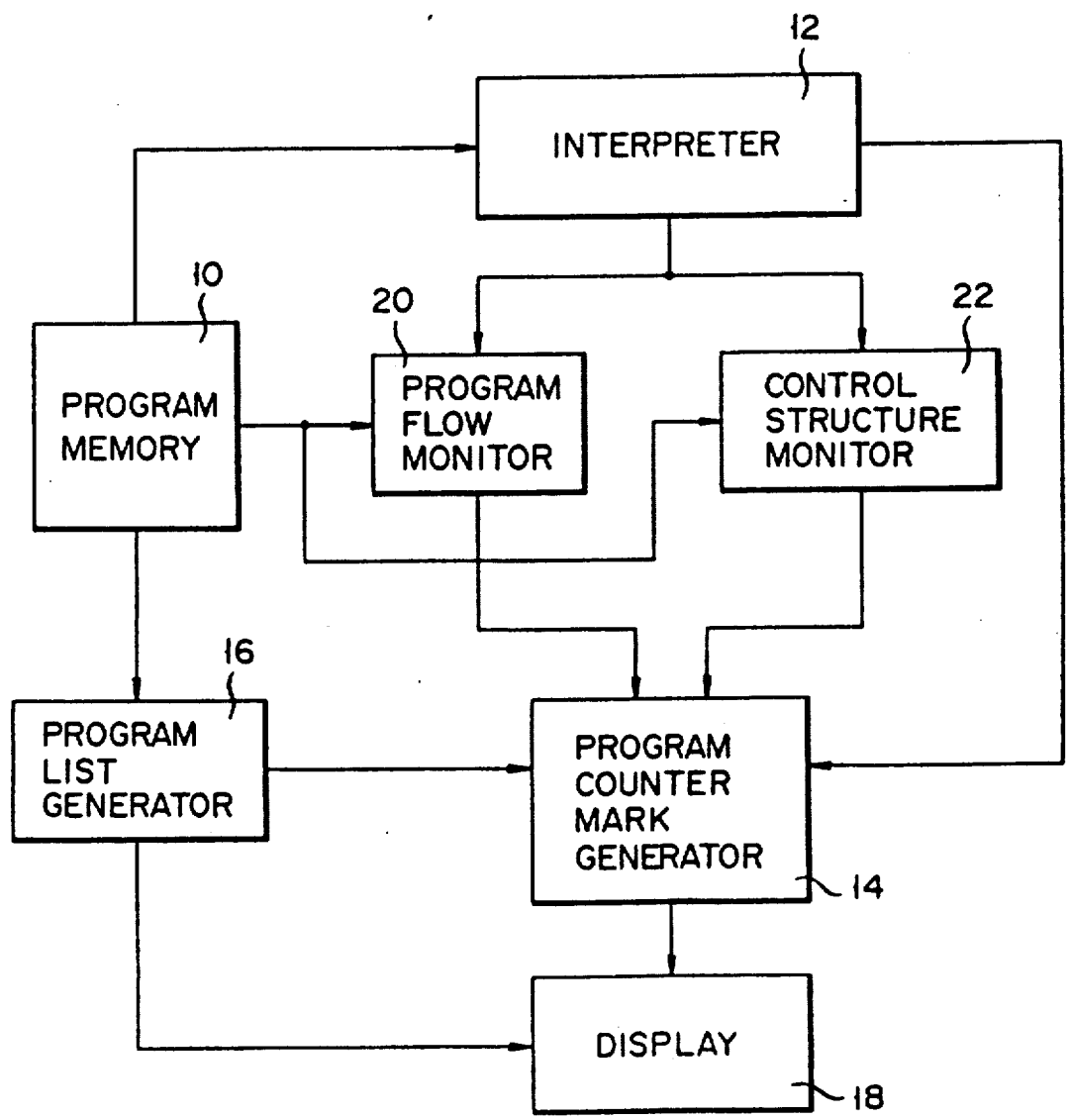

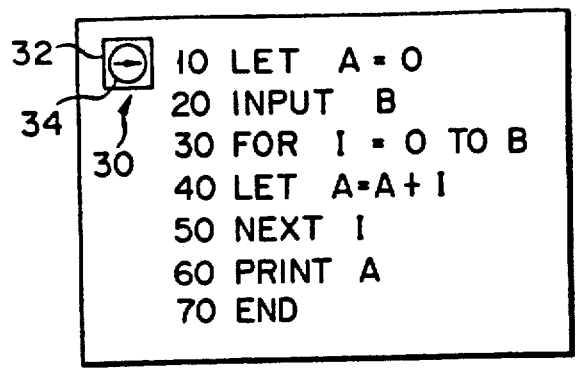
F I G. 2A
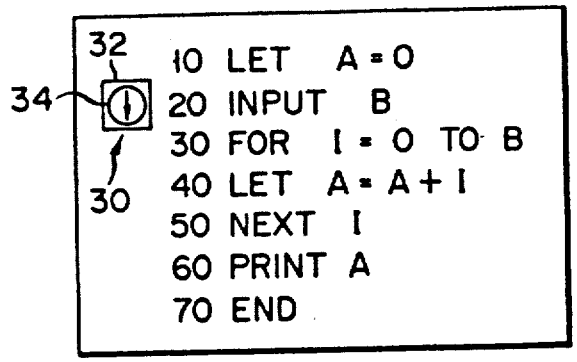
F I G. 2B
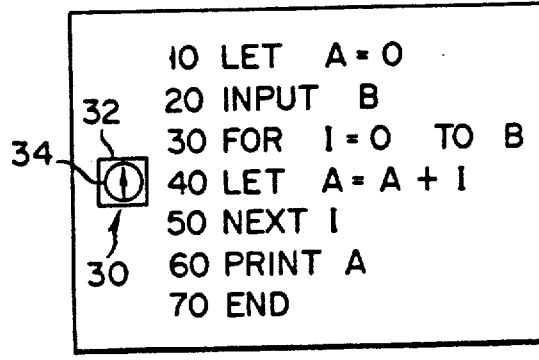
F I G. 2C
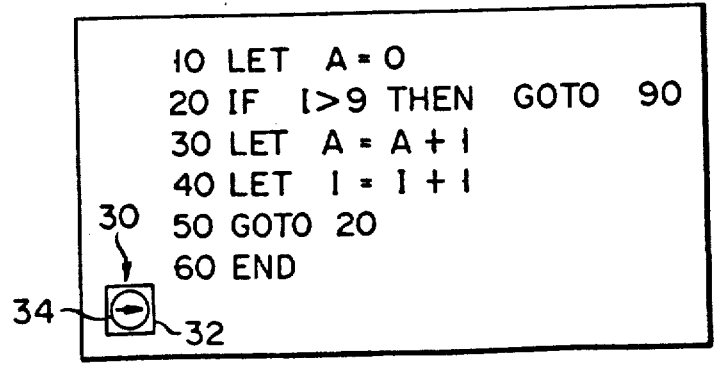
F I G. 2D

PROGRAM COUNTER DISPLAY DEVICE

BACKGROUND OF THE INVENTION

This invention relates to a program counter display device for displaying the contents of a program counter.

Generally, in debugging a computer program, the operation stage of the program is traced, to recognize the operation thereof. The operation stage of the program can be known from the contents (memory addresses) of a program counter. However, the memory addresses represented by binary numbers or hexadecimal numbers are difficult to correlate with the actual program lines (statements) of a program written in high-level language, and too difficult to handle. The actual program can be executed, but the statement number of a statement being executed and the program list cannot be displayed simultaneously. It is thus difficult to correlate a statement number with a program statement. Since the statement number is displayed as numeric data, it is difficult to trace the numeric data in order to monitor the execution state of the program.

A program generally possesses a control structure such as repetitions(loops), and elements for changing the program flow, such as branches, subroutine read-out, etc. Therefore, in debugging the program, the ability to recognize the control structure of the program and the program flow therein is desirable. However, it has hitherto been difficult to recognize the control structure and the program flow, since in the prior art, only the contents of a program counter or the statement numbers of the debug program are displayed.

SUMMARY OF THE INVENTION

An object of this invention is to provide a program counter display device which can effectively display the contents of a program counter for a computer program which is being executed, in association with the program list.

To attain the above object in accordance with this invention, a program counter display device is provided, comprising a first display for displaying the program list of a program which is being executed, a monitor for detecting the program flow and/or the control structure of the program, and a second display for displaying a program counter mark showing the program flow and/or control structure, in correspondence with the displaying of the program list.

BRIEF DESCRIPTION OF THE DRAWINGS

FIG. 1 is a block diagram of an embodiment of the program counter display device according to this invention;

FIGS. 2A to 2D are views showing the way of displaying the program flow in this embodiment;

DESCRIPTION OF THE PREFERRED EMBODIMENT

Figure 3:
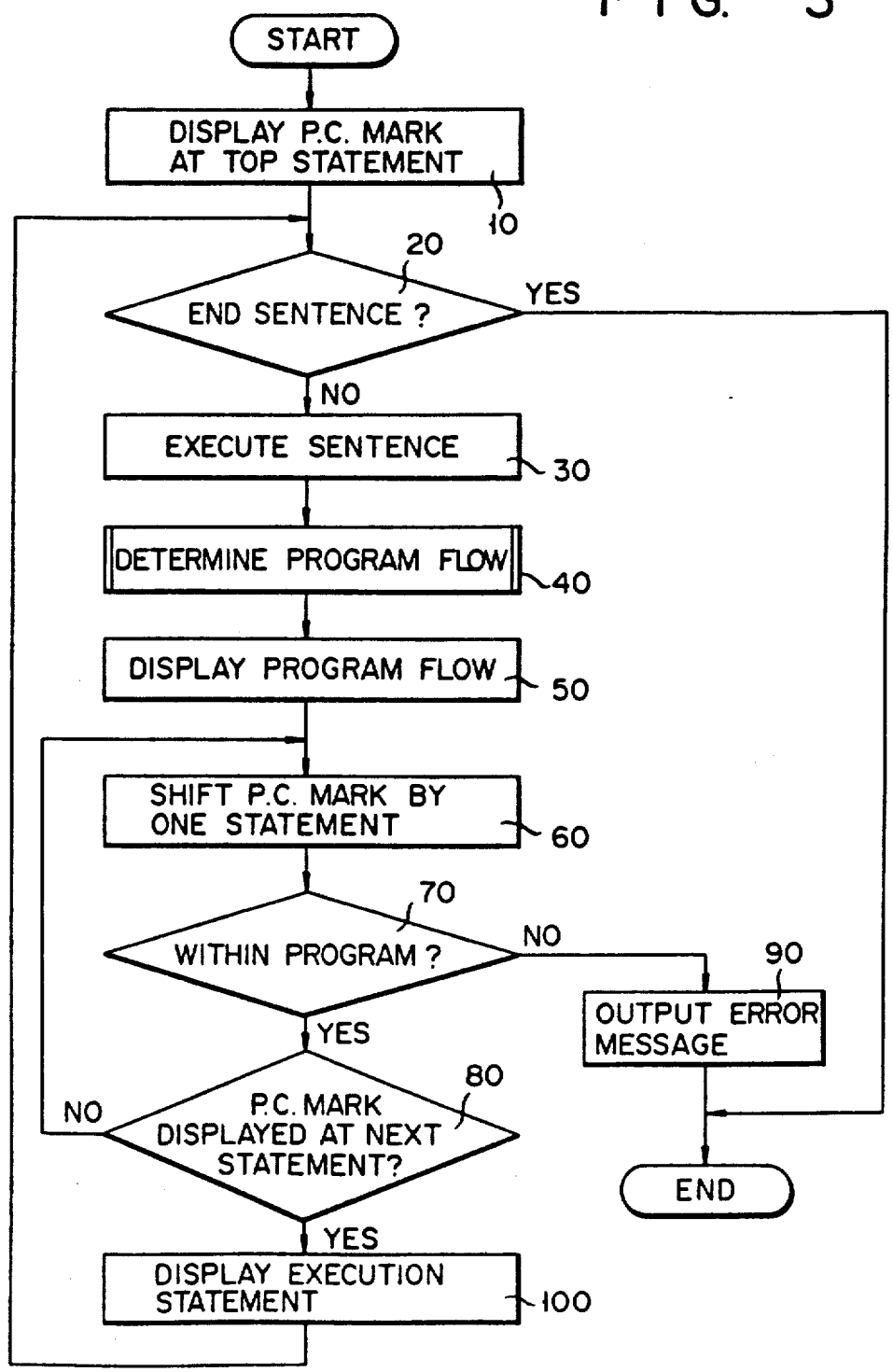
FIG. 3 is a flowchart showing display control of the program flow in this embodiment.

Referring now to the drawings, one embodiment of the program counter display device according to this invention will be explained.

FIG. 1 is a block diagram of one embodiment according to this invention. A source program is previously stored in a program memory 10. An interpreter 12 reads out the source program from the program memory, one statement at a time, and translates the read-out sentence into an object program. Intepreter 12 then executes the sentence (an object program), and also supplies the statement number of the statement now being executed, to a program counter mark generator 14.

A program list generator 16 supplies to a display device 18 the program list of a program read out from program memory 10.

Display device 18 displays the program counter mark which is supplied from the program counter-mark generator 14 in connection with the program list. The program counter mark includes a graphic pattern representative of the program counter function comprising the program flow and the control structure of the program, which will be described later in detail.

A program flow monitor 20 has the knowledge of the program flow of the program stored in the memory 10, and decides the program flow in accordance with the statement number currently being executed, which is supplied from interpreter 12. Program flow monitor 20, in addition, supplies information of the chosen program flow to program counter-mark generator 14.

A control structure monitor 22 monitors the control structure of the program stored in program memory 10, Monitor 22 receives from interpreter 12 the statement number of the statement now being executed, and correlates this number with the program control structure. Control structure monitor 22 also carries out a balance check of the program control structure, such as checking for the end of a repetition (loop) structure, the presence of the destination of a branch sentence, etc. In this way, the information relating to the program control structure is supplied to program counter, mark generator 14.

Program counter-mark generator 14 changes the manner and display position of the program counter mark, in accordance with (i) information relating to the program flow and (ii) information of the control structure, thereby controlling the displaying of the program flow and the control structure of the program.

First, display control of the program counter mark, in accordance with (i) the information relating to the program flow, will be explained.

FIGS. 2A to 2D show relations between the program list and the program counter mark which are displayed on the display device 18.

FIGS. 2A to 2C illustrate the program list of the BASIC program

| 10 | LET   | A = 0      |
|----|-------|------------|
| 20 | INPUT | B          |
| 30 | FOR   | I = 0 TO B |
| 40 | LET   | A = A + 1  |
| 50 | NEXT  | I          |
| 60 | PRINT | A          |

```
                    -continued
        70          END
``` and a program counter mark 30, the display of which is controlled in animation, in accordance with the execution of the program.

FIG. 2D illustrates the program list of the BASIC program

```
        10    LET     A = 0
        20    IF      I > 9  THEN  GOTO  90
        30    LET     A = A + 1
        40    LET     I = I + 1
        50    GOTO    20
        60    END
``` which contains an error in the branch sentence, and the program counter mark 30 which is displayed in animation and controlled in accordance with the execution of the program.

Program counter mark 30 is constituted by a box section 32 which contains all the information relating to the program control structure and a direction-(sense) indication section 34 indicating the statement number of the statement now being executed and the direction of the program flow. If the arrow of the direction-indicating section 34 points right, the destination being pointed to represents the statement number of the statement currently being executed. If the arrow points upward or downward, the direction of the arrow represents the direction (sense) of the program flow.

Program counter-mark generator 14 changes the display position of program counter mark 30 in accordance with the statement number and the direction of the program flow of the execution program which is supplied from interpreter 12, thereby displaying in animation program counter mark 30 in accordance with the program executed.

Program counter-mark generator 14, in accordance with the program flow which is supplied from program flow monitor 20, controls the upward or downward direction of the arrow of direction indicating section 34 during the transition of the program statements, and displays the direction (sense) of the program flow.

FIG. 2A shows the state where a program statement of the statement No. 10 is carried out; FIG. 2B shows the state where the program flow is in a forward direction (increasing the statement number); FIG. 2C shows the state where the program flow is in a backward direction (decreasing the statement number); and FIG. 2D shows the state where the program counter mark 30 is displayed in an area outside the area for displaying the program list. This signifies a program error (the case where although the program has a branch sentence, its destination cannot be found).

Figure 4:
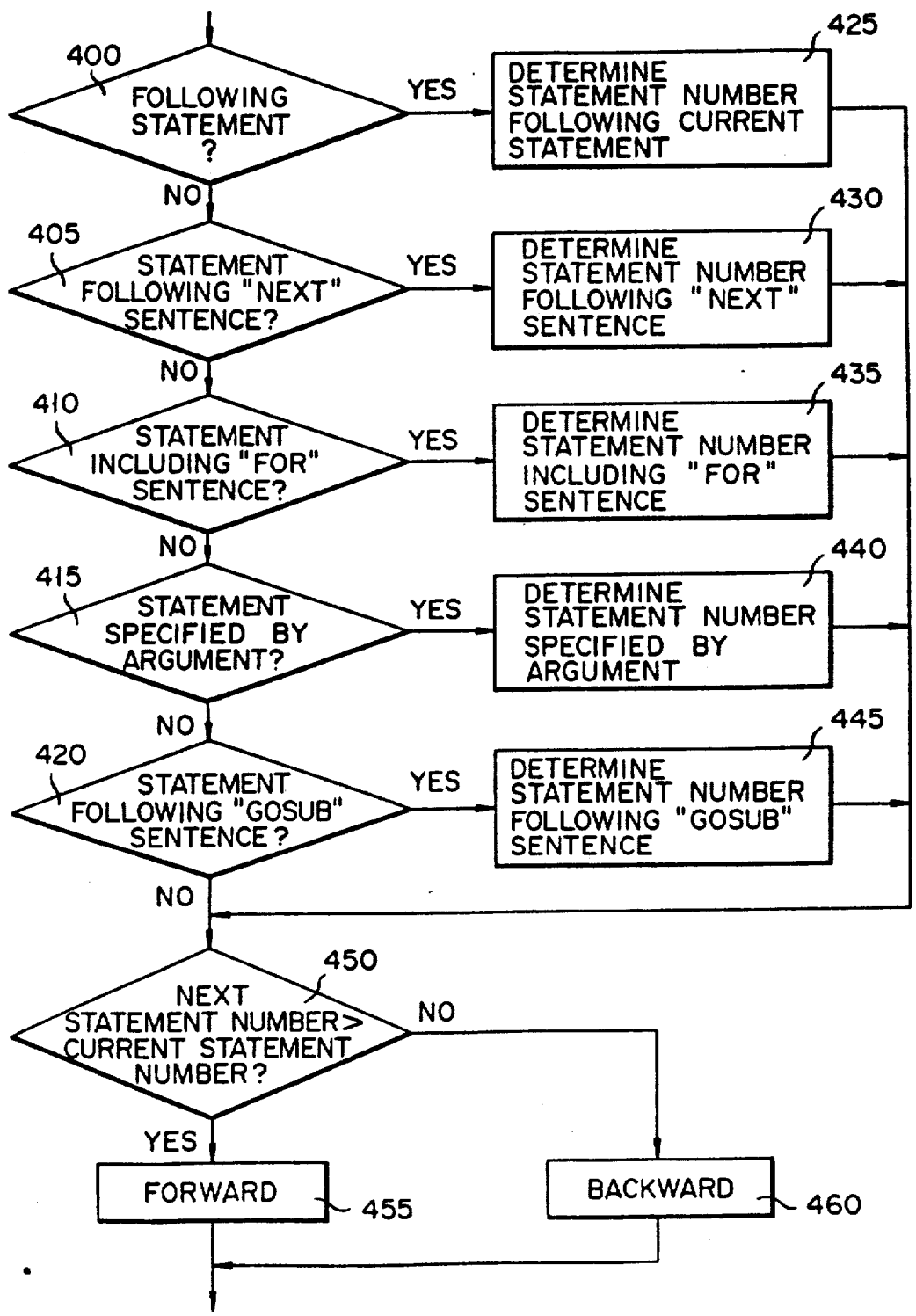
FIG. 4 is a flowchart showing details of the steps

Display control of program counter mark 30 will now be explained, with reference to the flowcharts of FIGS. 3 and 4. FIG. 3 is a main flowchart, and FIG. 4 is a flowchart which shows the details of the step of determining the program flow in FIG. 3.

First, in step 10, the top line (top statement) of a program is read, and its statement number is supplied to program flow monitor 20, control structure monitor 22, and program counter-mark generator 14. Program counter-mark generator 14 reads from interpreter 12 the display position information of the top statement, so as to decide the display position of program counter mark 30. Then, the top statement is executed, so that the arrow of the direction indicating section 34 is directed right. This state is shown in FIG. 2A.

In step 20, a check is carried out to determine if the sentence included in the statement read from program memory 20 is an END sentence. If it is an END sentence, the processing is ended.

If it is not an END sentence, in step 30, that sentence is translated into an object program by interpreter 12 to perform the processing.

After the processing of that sentence is ended, in step 40, program flow monitor 20 acquires the statement number of next statement to be executed and the data indicating the direction of the program flow (forward direction or backward direction). The next statement is determined, as is shown in the following Table, in accordance with the type of the sentence the processing of which has been ended.

TABLE

| Type of sentence | Program flow (next statement) |
|---|---|
| INPUT | following statement |
| LET | following statement |
| PRINT | following statement |
| FOR | following statement, if the value of the variant is within the condition range, the statement following the NEXT sentence, if the value of the variant is outside the condition range |
| NEXT | statement including FOR sentence |
| GOTO | statement specified by first argument |
| GOSUB | statement specified by first argument |
| RETURN | statement following GOSUB sentence in the main routine |

The details of step 40 are shown in FIG. 4. The following checkings are performed on the program flow:

Is it the following statement? (step 400);

Is it the statement following the "NEXT" sentence? (step 405);

Is it the statement including the "FOR" sentence? (step 410);

Is it the statement specified by the first argument? (step 415); and

Is it the statement following the "GOSUB" sentence? (step 420).

If checking results indicating YES have been obtained in steps 400, 405, 410, 415, and 420, the statement number of the next statement to be executed is decided in step 425 (the number of the statement following the current statement), step 430 (the statement number of the statement following the "NEXT" sentence corresponding to the current "FOR" sentence), step 435 (the statement number of the statement including the "FOR" sentence corresponding to the current "NEXT" sentence), step 440 (the statement specified by the first argument), and step 445 (the statement number of the statement following the "GOSUB" sentence corresponding to the current "RETURN" sentence), respectively.

After the next statement number has been determined, in step 450, a check is carried out to determine if the next statement number > the current statement number. If the answer is YES, in step 455, the program flow is judged to be in the forward direction. If the answer is NO, in step 460, a judgement that the program flow is judged to be in backward direction is made.

After the direction of the program flow has been determined, in step 50 of FIG. 3, the program counter-mark generator 14 displays the direction of the program flow in accordance with the information of the chosen program flow direction. This is performed, in the case of the forward direction, by pointing downward the arrow of direction-indicating section 34 of program counter mark 30 and, in the case of the backward direction, by pointing the arrow upward.

In step 60, the display position of program counter mark 30 is shifted by one statement. Namely, in the case of the forward direction, program counter mark 30 is displayed at the display position of the statement just below the current statement in the program list; in the case of the backward direction, it is displayed at the display position of the statement just above the current statement in the program list. Examples of the display in step 60 are shown in FIGS. 2B and 2C.

Thereafter, in step 70, a check is carried out to determine if the display position of program counter mark 30 is within the display area of the program list. If the display position lies outside the position of the top statement or the final statement of the program list, in step 90, an error message is output, thereby ending the processing. This state is shown in FIG. 2D.

If the display position is within the display area of the program list, in step 80, a check is carried out to determine if program counter mark 30 is displayed at the position of the next statement. If the answer is NO, the steps starting from step 60 are repeated.

If program counter mark 30 is displayed at the next statement, in step 100, the arrow of program counter mark 30 is directed right, thereby indicating the execution of the statement.

Thus, display control of the program counter mark 30 which indicates the program flow from a certain statement to the next statement is ended.

Further, the processing steps from step 20 are executed again for the next statement. Thus, program counter mark 30 is displayed in animation in accordance with the execution of the program statement as shown in FIGS. 2A to 2D, and the arrow of direction-indicating section 34 indicates the execution statement or the direction of the program flow.

An embodiment describing a second way of controlling program counter mark 30, i.e., display control thereof, on the basis of (ii) the control structure of the program, will now be explained.

FIGS. 5A to 5D show relations between the program list and program counter mark 30, which are displayed on display device 18.

Figure 5A:
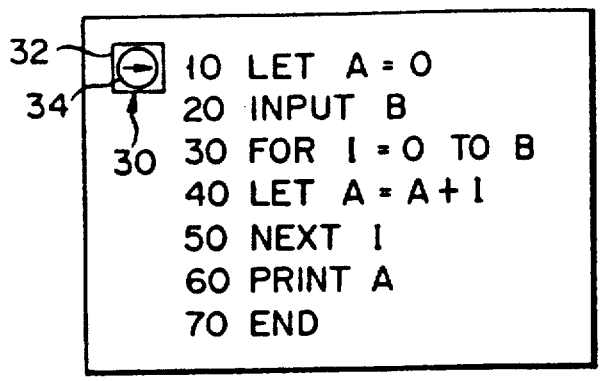
FIGS. 5A to 5D are a view showing the way of displaying the control structure in this embodiment.
Figure 5B:
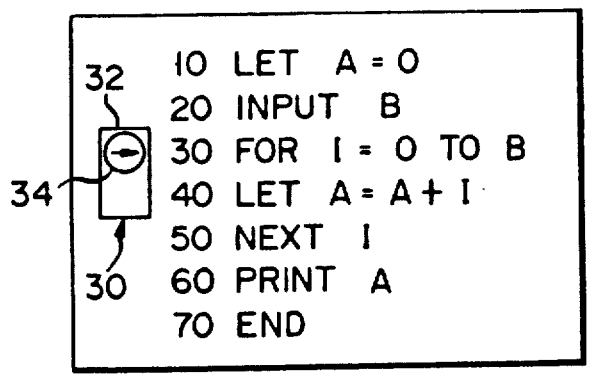
Figure 5C:
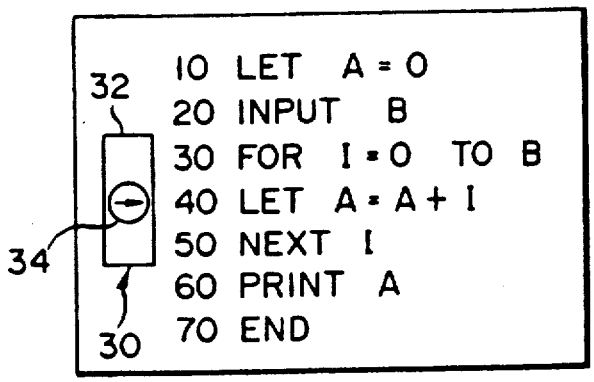
Figure 5D:
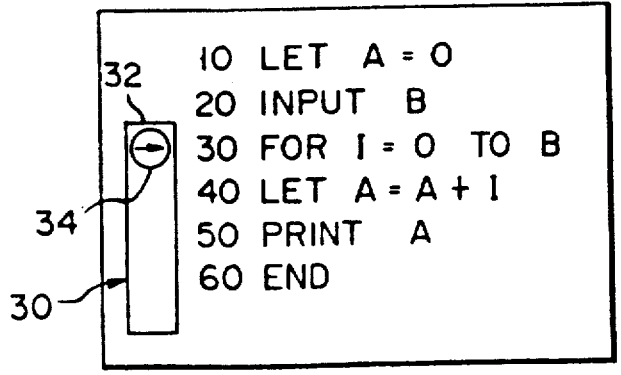

FIGS. 5A to 5C show the program list of the BASIC program, which is the same as is shown in FIGS. 2A to 2D, and program counter mark 30 the display of which is controlled in animation in accordance with the execution of the program. FIG. 5D shows the program list of the BASIC program

| | | |
|---|---|---|
| 10 | LET | A = 0 |
| 20 | INPUT | B |
| 30 | FOR | I = 0 TO B |
| 40 | LET | A = A + 1 |
| 50 | PRINT | A |
| 60 | END | | which includes an error in the loop control structure, and program counter mark 30 the display of which is controlled in animation in accordance with the execution of the program.

Display control of program counter mark 30 on the basis of the program control structure is carried out by varying the size of box section 32, which contains the information relating to the program control structure. Direction-indicating section 34, which indicates the execution statement or the direction of the program flow, is controlled as mentioned above.

Program counter-mark generator 14 changes the figure of program counter mark 30, particularly the display position of direction-indicating section 34, in accordance with the program statement being executed, which is supplied from interpreter 12, and changes the size and display position of box section 32 of program counter mark 30 correspondingly to that control structure, in accordance with the program control structure, which is supplied from control structure monitor 22.

FIG. 5A shows the state where a program statement is being executed; FIG. 5B shows the balance of a loop control structure is being checked, FIG. 5C shows the state where the loop sentence of the loop control structure is being executed; and FIG. 5D shows the state where, as a result of balance checking of the loop control structure, an error has been found.

Display control of program counter mark 30, on the basis of the control structure of the program, will now be explained with reference to the flowcharts of FIGS. 6 and 7.

First, in step 200, as in step 10, program counter mark 30 is displayed at the display position of the top statement of the program list. This state is shown in FIG. 5A.

In step 210, a check is carried out to determine if the sentence included in the statement read out from interpreter 12 is an END sentence. If the answer is YES, the processing is ended.

If the answer is NO, in step 220, a check is carried out to determine if the sentence is a FOR sentence. If the answer is YES, in step 230, the balance of the control structure of that program is checked, using control structure monitor 22.

Figure 7:
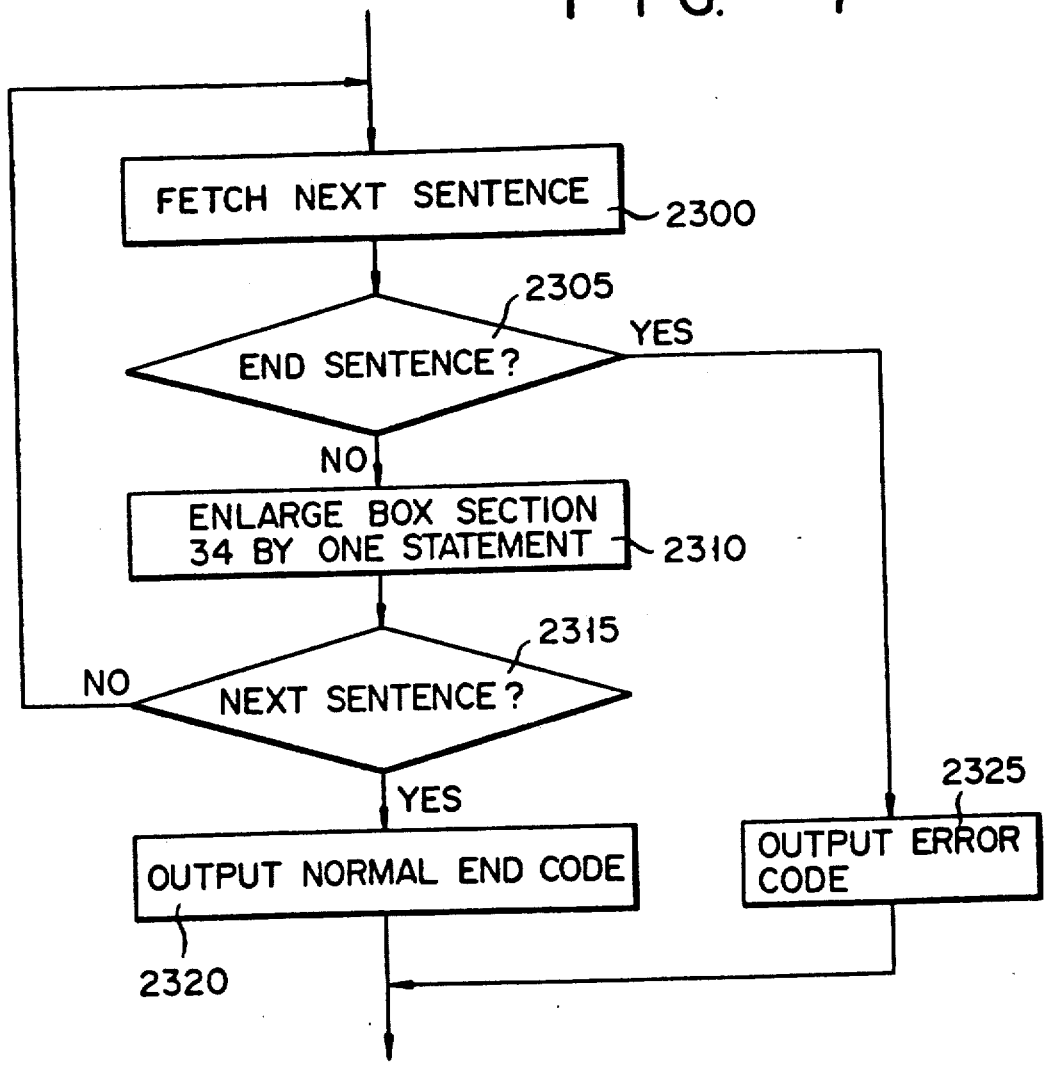
FIG. 7 is a flowchart showing the details of the steps of checking the balance of the control structure in FIG. 6.
Figure 8:
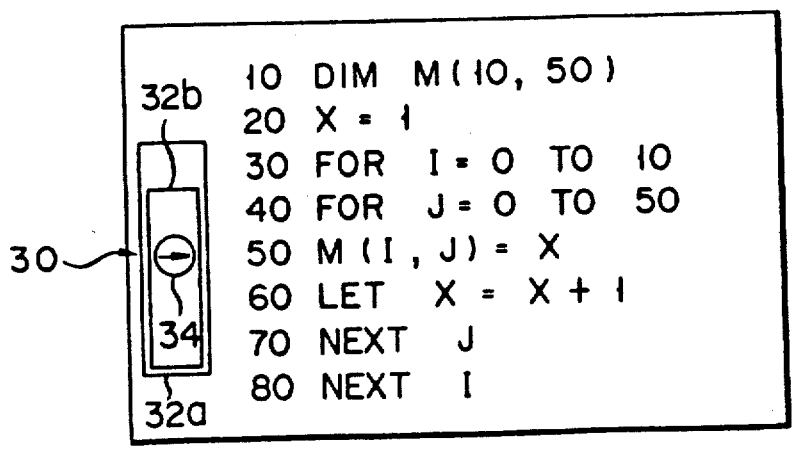
FIG. 8 is a view showing the way of displaying the control structure in this embodiment, when it is a nesting structure.

The details of the balance check are shown in FIG. 7. In step 2300, the next statement is read out from program memory 10. In step 2305, a check is carried out to determine if the sentence included in the next statement is an END sentence.

If it is not an END sentence, in step 2310, the display of box section 32 of program counter mark 30 is enlarged so as to include the display position of the next statement. This state is shown in FIGS. 5B and 5C.

In step 2315, a check is carried out to determine if the sentence included in the above next statement is a NEXT sentence. If it is not a NEXT sentence, the processing performed in step 2300 is repeated. If it is a NEXT sentence, in step 2320, a normal end code is output so as to return the processing to a main routine of FIG. 6. If an END sentence is found before a NEXT sentence is found in step 2305, which means that the control structure from step 2305 to step 2320 cannot be formed, in step 2325, an error code is output so as to return the processing to the main routine of FIG. 6. Then, the display of program counter mark 30, particularly box section 32 is enlarged so as to include the END sentence as shown in FIG. 5D.

Figure 6:
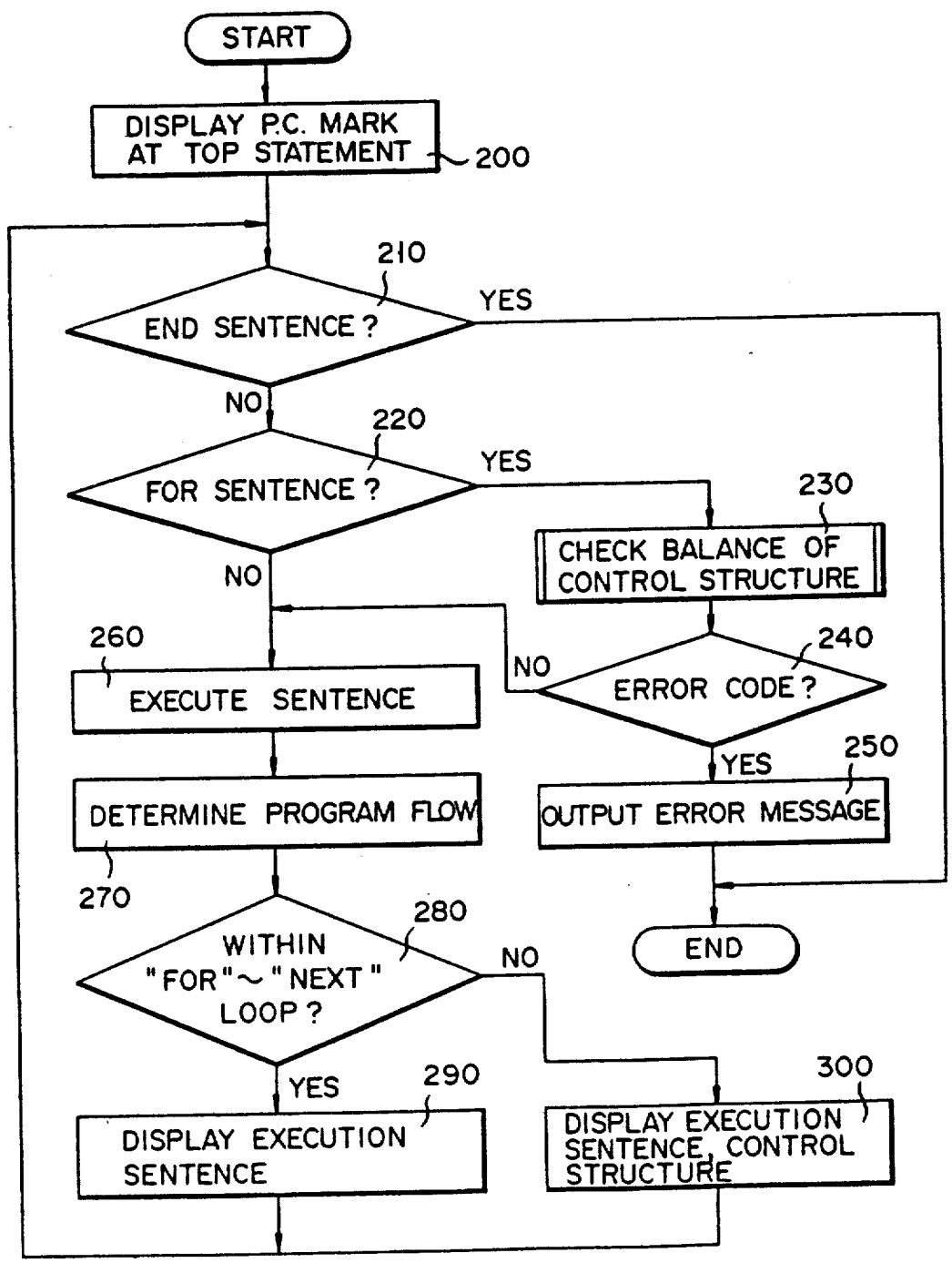
FIG. 6 is a flowchart showing display control of the control structure in this embodiment.

After the balance check has been performed as mentioned above, the processing routine returns to the flowchart of FIG. 6. In step 240, a check is carried out to determine if the control structure includes an error. If the error code has been detected, in step 250, an error message is output, thus ending the processing.

If the read program sentence is not an END sentence nor a FOR sentence, or the control structure does not contain an error, in step 260, that sentence is executed as in step 30 of FIG. 3.

After the execution of the above sentence has been completed, in step 270, the next statement to be executed is determined in accordance with the program flow as in step 40 of FIG. 3.

In step 280, a check is carried out to determine if the next statement, which is designated by the box section of program counter mark 30, is included within a loop control structure from the FOR sentence to the NEXT sentence.

If it is within the loop control structure, in step 290, the display position of direction-indicating section 34 is shifted through the position of the next sentence decided in step 270, within the box section 32 representative of that control structure.

If it is not within the loop control structure, in step 300, the display of the control structure, by box section 32, is stopped and the display of program counter mark 30 is changed to indicate only the execution of the sentence selected in step 270.

In this way, by changing the size of box section 32 of program counter mark 30 in accordance with the control structure of the program, and controlling the display position of direction-indicating section 34 and the direction of the arrow thereof, it is possible to display the state of the program counter while displaying the control structure of the program.

Incidentally, the loop control structure of a program may be nested. In this case, all that has to be done is to provide control structure monitor 22 with such information and to replace the box section with nested box sections 32a and 32b.

Thus, display control of program counter mark 30, which represents the transition of the program execution from a certain sentence of the program to a next sentence, is ended, and the processing from step 210 is once again executed for the next sentence. Thus, program counter mark 30 is displayed in animation, in accordance with the program flow indicated by the direction of the arrow of direction-indicating section 34.

As has been described above, in accordance with this invention, the program flow is monitored by program flow monitor 20, while control structure such as a loop is monitored by control structure monitor 22. In accordance with this information, by changing, in animation, the manner displaying the direction-indicating section 34 and box section 32 of program counter mark 30 which is displayed, together with a program list, on a display device 18, the program flow and the control structure can be obviously recognized, which provides considerable advantages as regards debugging of a program, studying the programming, etc.

It should be understood that the foregoing description is a preferred embodiment and that various changes and modifications may be made. For example, display of the program flow and of the control structure has been presented separately for the sake of convenience. However, both may be presented simultaneously or either one may be presented. Further, the way of displaying the program counter function is not limited to that mentioned above if it can display the program flow and the control structure.

What is claimed is:

1. A program counter display device simulating an operation of a program counter during an executing of a program, said device comprising:
   means for displaying on a screen statements included in a program list for a program which is being executed;
   means, responsive to an output of the program counter, for displaying on the screen an arrowlike indicator, the indicator being positioned at a row of the screen on which a statement being executed is displayed, and directed horizontally toward the statement being executed when the output of the program counter is fixed, and shifted and directed vertically toward a statement to be executed next when the output of the program counter is changed;
   means for detecting a syntax error in the program, relating to an absence of the statement to be executed next; and
   means for positioning the indicator to a row of the screen at which no statement is displayed when the syntax error is detected by said detecting means.

2. A device according to claim 1, wherein:
   said statements displaying means comprises means for displaying each statement including a statement number and an instruction which is positioned to the right of the statement number; and
   said indicator displaying means comprises means for displaying the indicator to the left of the statement number.

3. A device according to claim 1, wherein:
   said program is a BASIC program; and
   said indicator positioning means comprises means for positioning the indicator to a row of the screen which is lower than a row at which an end statement is displayed when a syntax error is detected.

4. A program counter display device simulating an operation of a program counter during an executing of a program, said device comprising:
   means for displaying on a screen statements included in a program list for a program which is being executed, the program including a repetition portion;
   means responsive to an output of the program counter, for displaying on the screen a combination of a rectangle and an arrowlike indicator included in the rectangle, the rectangle being positioned at a row of the screen at which a statement being executed is displayed and the indicator being directed horizontally toward the statement being executed when the output of the program counter is fixed, and the rectangle being shifted and the indicator being directed vertically toward a statement to be executed next when the output of the program counter is changed;
   first detecting means, for detecting if a statement being executed is a first statement of the repetition portion;
   second detecting means, for detecting a last statement of the repetition portion when said first detecting means detects that the statement being executed is the first statement;
   means for extending the bottom of the rectangle toward the last statement of the repetition portion when said first detecting means detects that the statement being executed is the first statement, the bottom being extended toward a row of the screen at which no statement is displayed when said second detecting means does not detect the last statement.

5. A device according to claim 4, wherein:
said statements displaying means comprises means for displaying each statement including a statement number and an instruction which is positioned to the right of the statement number; and
said displaying means comprises means for displaying the combination to the left of the statement number.

* * * * *